United States Patent [19]
Akers

[11] Patent Number: 5,997,229
[45] Date of Patent: Dec. 7, 1999

[54] SCREW COVER AND METHOD

[76] Inventor: Paul Akers, 1730 Squalicum Mountain Rd., Bellingham, Wash. 98226

[21] Appl. No.: 09/118,454
[22] Filed: Jul. 17, 1998

Related U.S. Application Data
[60] Provisional application No. 60/052,838, Jul. 17, 1999.

[51] Int. Cl.⁶ .................................................. A47G 3/00
[52] U.S. Cl. .................... 411/373; 411/372.5; 411/377
[58] Field of Search ................................. 411/910, 399, 411/372.5, 372.6, 373–377

[56] References Cited

U.S. PATENT DOCUMENTS

| | | |
|---|---|---|
| 264,776 | 9/1882 | Sharp . |
| 1,867,736 | 7/1932 | Finkeldey ................................. 411/373 |
| 2,363,665 | 11/1944 | George . |
| 3,122,051 | 2/1964 | Greene . |
| 3,230,817 | 1/1966 | Thomas .................................... 411/371 |
| 4,601,624 | 7/1986 | Hill . |
| 4,630,168 | 12/1986 | Hunt . |
| 4,701,089 | 10/1987 | Nettel . |
| 4,747,241 | 5/1988 | Whitman ................................. 411/377 |
| 4,923,348 | 5/1990 | Carlozzo et al. . |
| 5,419,666 | 5/1995 | Best ......................................... 411/373 |

FOREIGN PATENT DOCUMENTS

| | | | |
|---|---|---|---|
| 1155556 | 5/1958 | France .................................... 411/373 |
| 2845492 | 4/1980 | Germany ................................ 411/373 |

*Primary Examiner*—Darnell M. Boucher
*Attorney, Agent, or Firm*—Hughes & Schacht, P.S.; Robert B. Hughes

[57] ABSTRACT

A method of covering the head of a screw which has been inserted into a wood structure, such as a cabinet, a bookshelf, etc. There is a planar circular cover member made of a moderately flexible plasctic and having an adhesive surface. The diameter of the cover member is moderately greater than the diameter of the screw head and the opening in which the screw head is placed. The cover member is placed by positioning a first side portion of the cover member adjacent to the opening, and then deflecting cover member downwardly in a curved position above the screw head opening, keeping the cover properly positioned. Then the person's thumb which grasps an end of the cover member is moved to release the cover member which then snaps into position to cover the opening and become bonded to the surface of the wood structure.

16 Claims, 12 Drawing Sheets

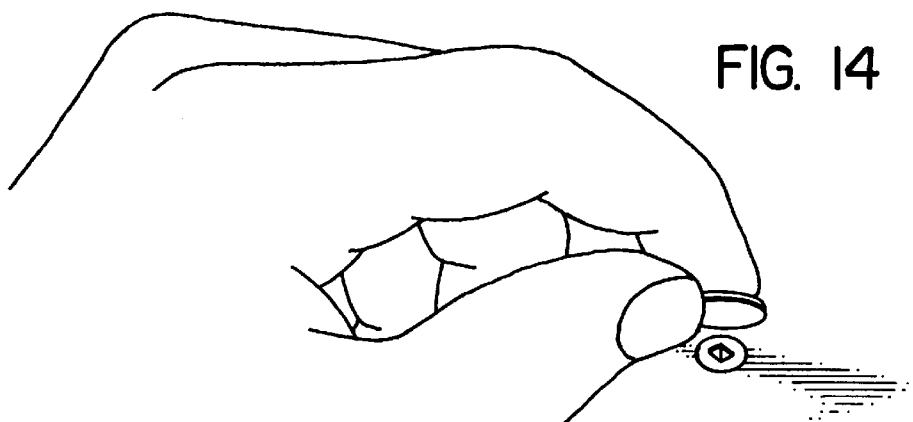
FIG. 14
FIG. 15
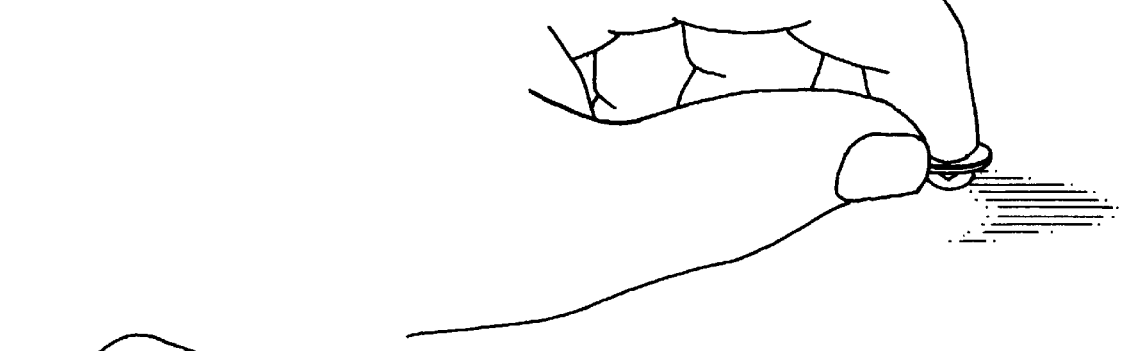
FIG. 16
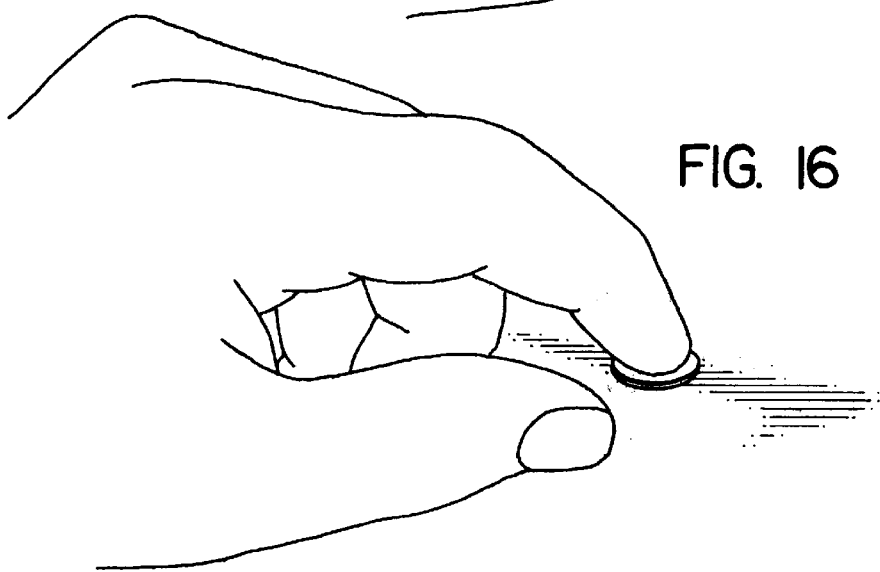

BASELINE

CLAMP SAMPLE AT 1/3 ITS LENGTH

BASELINE

MEASURE BOTTOM END OF SAMPLE TO BASELINE

BASELINE

CLAMP 3 GRAM WT. TO SAMPLE

MEASURE BOTTOM END OF SAMPLE TO BASELINE

BASELINE

FIG. 21

| Fastcap Material Survey | Item # | Material | Thickness | Hardness | Unloaded State | Loaded State | Deflection |
|---|---|---|---|---|---|---|---|
| | 1 | PVC | 0.016 | 75 shoreD | 1.305 | 1.167 | 0.138 |
| | 2 | PVC | 0.0165 | 75 shoreD | 1.245 | 1.141 | 0.104 |
| | 3 | PVC | 0.017 | 75 shoreD | 1.319 | 1.248 | 0.071 |
| | 4 | TPE | 0.02 | 40 shoreD | 1.188 | 0.911 | 0.277 |
| | 5 | TPE | 0.02 | 50 shoreD | 1.228 | 1.059 | 0.169 |
| | 6 | TPE | 0.02 | 64 shoreA | 1.153 | 0.131 | 1.022 |
| | 7 | TPE | 0.02 | 73 shoreA | 1.17 | 0.22 | 0.95 |
| | 8 | TPE | 0.02 | 80 shoreA | 1.182 | 0.348 | 0.834 |
| | 9 | TPE | 0.02 | 87 shoreA | 1.22 | 0.681 | 0.539 |

SCREW COVER AND METHOD

This application claims the benefit of U.S. Provisional Application No. 60/052,838 filed Jul. 17, 1999.

BACKGROUND OF THE INVENTION a) Field of the Invention

The present invention relates generally to the woodworking art, and more particularly to the making of finished wooden articles, such as cabinets (either built in or free standing), bookshelves, magazine racks, furniture, etc. More particularly, the present invention relates to the manner in which the exposed heads of the wood screws are covered in making the finished article.

b) Background Art

A variety of people are involved in the woodworking industry. There is the professional woodworker who makes quality items such as cabinets, desks or bookcases, or even larger projects such as building entire interior of a kitchen in a home. Also, there are those who have woodworking for a hobby, with varying degrees of skill. Then there are the people who do not actually work in the woodworking art, but who will purchase various items, such as desks, chairs, bookshelves, etc., the components of which are premade, but not assembled. Then this person has the task of joining the various pieces together by placing the pieces in the appropriate preassembled position, inserting the screws one at a time, and using a screwdriver to screw these in to hold the pieces in place.

After the screws are in place, all of these people (the professional woodworker, the amateur woodworker, and the person simply assembling a premade article) have a common problem, and this is how to cover the exposed heads of the screws. Quite commonly, these screws are countersink screws where the non-exposed surface of the screw head has a frusto conical shape, and the hole is drilled as a countersunk hole, where the outer portion of the hole has a corresponding frusto conical shape. Thus, when the screw is inserted, the exposed face of the screw head is flush with (or nearly flush with) the adjacent surface of the wood piece into which the screw is inserted. For many decades, the commonplace method of covering the exposed screw head is to place a cap over the exposed screw head, and push the cap into retaining engagement with the screw head. The cap is configured so that it has a dome shaped cap portion and a center stub or probe which matches the configuration of the Philips head recess in the exposed surface of the screw. When the cap is pressed against the screw head, the probe comes into retaining engagement with the screw head.

It sometimes happens that the countersink recess of the premade screw hole is a slight amount out of tolerance, in that it has been drilled too deeply. In this instance, when the screw is inserted and tightened up in firm engagement, the exposed surface of the screw head is a short distance below the surrounding surface of the wood piece into which it is inserted. The result of this is that the probe of the cover cap does not properly engage the Philips head recess and the screw head. Then the person needs to either press or hammer the cover cap further into the screw hole, so that the dome shaped cover cap flattens out and the probe does come into proper engagement. This particular prior art process will be described more fully later in the text of this application with reference to FIGS. 1 through 8.

One of the undesirable results of this is that with some frequency the cover caps become dislodged (probably because they were never secured properly in the first place).

Also, there are inconveniences in the application of the caps. Yet, this particular type of cover cap and the method of installing the same has remained as the state of the art for many decades, and to the best knowledge of the applicant, no improved method has been adopted in the woodworking industry. A search of the patent literature has disclosed a number of cover devices for a fastener the earliest patent disclosed in this search issued in 1882 and the most recent issued in 1995. These are as follows.

U.S. Pat. No. 5,419,666 (Best) shows a protective cover assembly to provide a waterproof cover over a fastener, this being used, for example, in roof structures. There is a dome shaped rigid cover which fits over the head of the screw. Then a flexible waterproof circular pad having a diameter greater than the dome shaped cover overlies the cover with the perimeter of the pad adhering to the support surface.

U.S. Pat. No. 4,701,089 (Nettel) provides a "quick release cover" which has at its center downwardly extending fingers which grasp the slot in the closure member or screw.

U.S. Pat No. 4,630,168 (Hunt) shows a "lightning protection fastener" used in aircraft. There is a metallic fastener having a dielectric cap to fill a gap between the fastener head and the counterbored surface on which the fastener is installed. It provides a continuous flush surface for receiving a crack-free coat of paint.

U.S. Pat. No 4,601,624 (Hill) shows a screw head cover that is held in place by a retaining element that is itself held by the screw.

U.S. Pat. No. 3,885,492 (Gutshall) shows a fastener for attaching sheet metal paneling to the outside wall of a building. There is a resilient screw head cover that is flexible enough to allow a tool to enter the fastener's head.

U.S. Pat. No. 3,122,051 (Greene) shows a decorative screw cover which has a snap connection to a washer which is placed beneath the screw head.

U.S. Pat. No. 2,363,665 (George) shows a cap to cover the head of a screw. The cover has legs which fit snugly in the countersink Philips slot in the screw head.

U.S. Pat. No. 915,058 (Bowen) issued in 1909 and shows a cover for the head of a screw which has a connecting member fitting in the slot in the head of the screw.

U.S. Pat. No. 264,776 (Sharp) issued in 1882, and this shows a hollow plug which fits into the upper portion of a countersink slot that is above the head of the screw. This permits expansion of the screw without displacement of the plug.

Also, the applicant is aware of a commercial product which is a planar circular cover having a diameter moderately larger than the screw hole which is to be covered. There is an adhesive surface by which the material can be placed over the screw hold and bonded in place. This is made of a quite flexible material. To the best knowledge of the applicant, this has not obtained a wide commercial success. The characteristics of this particular cover member are discussed later in the text of this application in connection with tests that were conducted to determine the desired characteristics of the cover member of the present invention.

SUMMARY OF THE INVENTION

The present invention is directed toward covering an exposed fastener, such as a screw, in a wood structure or the like where there is provided a cover member, a method of applying the cover member to the structure in an effective and convenient manner, and also the combination of the structure, fastener, and cover member.

The structure itself has a structure surface. This could be a natural surface, a veneer surface made of wood and or another material, or some other surface material. A fastener, such as a screw, is positioned in the structure in a manner that there is a surface opening in the structure. The surface opening has a perimeter edge with predetermined maximum edge to edge lateral dimensions.

The planar cover member comprises an exposed surface on one side, a contact surface on an opposite side, and a perimeter edge portion having lateral dimensions greater than corresponding lateral dimensions of the surface opening. The perimeter edge portion has a perimeter surface contact portion, and there is an adhesive material located at least at a perimeter contact portion of the contact surface.

The cover member is applied to the structure surface to cover the surface opening so that the perimeter portion of the cover member is properly positioned relative to the perimeter edge portion of the surface opening. The cover member is moved into engagement with surface of the structure so that the perimeter contact portion of the cover member becomes bonded to at least a surface portion of the structure surrounding the surface opening.

The cover member is sufficiently resistant to bending so that in the application of the cover member to the structure surface, with the cover member being positioned so that with a first edge portion of the cover member being located at a first location of the structure surface near the perimeter edge of the surface opening, a second portion of the cover member may be grasped in a manner to manipulate the cover member. This is done in a manner to cause enough force to be transmitted from the second portion of the cover member through the cover member to the first portion of the cover member to press the first portion of the cover member into engagement with the surface structure at the first location. This is done so that resistance to lateral movement of the first portion of the cover member at the first location is sufficiently great so that the cover member can be moved toward the structure surface into its proper position with the perimeter contact portion of the cover member surrounding the surface opening to cover the surface opening, and with the first portion of the cover member remaining at the first location to stabilize the cover member as it is moved to its covering position.

The cover member is sufficiently flexible so that when the force is transmitted from the second portion of the cover member to the first portion of the cover member, the cover member is caused to bend with an outwardly concave curvature to cause the first portion of the cover member to be slanted to be more closely in alignment with the surface structure at the first location.

In a preferred form, the cover member is sufficiently flexible to enable a surface contact portion of the first portion of the cover member to come into surface to surface engagement with adjacent portion of the surface structure so as to resist lateral movement of the first portion of the cover member relative to the surface structure. Desirably, this is accomplished in a manner so that cover member is curved in an upward curve away from the structure surface to enable at least a portion of the opening to be visible and permit a person manipulating the cover member to properly view alignment of the cover member.

Also, the cover member is sufficiently resilient so that when a part of the cover member is released so that a bending moment on the cover member is released and a downward force continues to be exerted against the top surface of the cover member, the cover member snaps into its cover position against the surface structure.

Further, in the method of the present invention, the cover member is manually grasped by a person positioning a thumb of the person at an opposite edge location of the cover member approximately diametrically opposed to the first edge portion of the cover member and a finger of the person being positioned against an exposed surface portion of the cover member between the first edge portion and the opposite edge portion. The person applies a force toward the structure surface with the finger and a force away from the structure surface with the thumb to transmit the force through the cover member to create a bending moment. Thus, said cover member is caused to come into engagement with the surface structure by the thumb being released from the cover member.

The cover member desirably has a reference deflection value less than 1.0 inch, more desirably less than 0.9 inch, no more than about 0.8 inch, or 0.7 inch. Desirably, the reference deflection value is no greater than about 0.6 inch. Quite satisfactory results have been achieved with a reference deflection value of between 0.0 and 0.2 inch. Also satisfactory results have been obtained by having a deflection value of between about 0.2 to 0.4 inch.

In the preferred form the reference deflection value should be greater than 0.0 inch. Other features of the present invention will be apparent for the following detailed description

BRIEF DESCRIPTION OF THE DRAWINGS

FIGS. 14, 15 and 16 show a method of placing the cover piece over the screw head.

FIG. 21 is a table showing various reference deflection values of the samples tested;

DESCRIPTION OF THE PREFERRED EMBODIMENT

It is believed that a better appreciation of the present invention will be obtained if the detailed description of the present invention is preceded by a more detailed description of the common prior art cover cap, and method of inserting the same (described briefly previously herein under "Background Art").

A. Further Description of the Prior Art

As described somewhat briefly previously herein, to the best knowledge of the applicant), for a number of decades there has been a prior art cover cap and a method of inserting the same which is probably the most common practice in the industry in covering the exposed surface of the countersunk heads of screws. The cover cap and the method of installing the same will now be described with reference to FIGS. 1 through 8.

Figure 1:
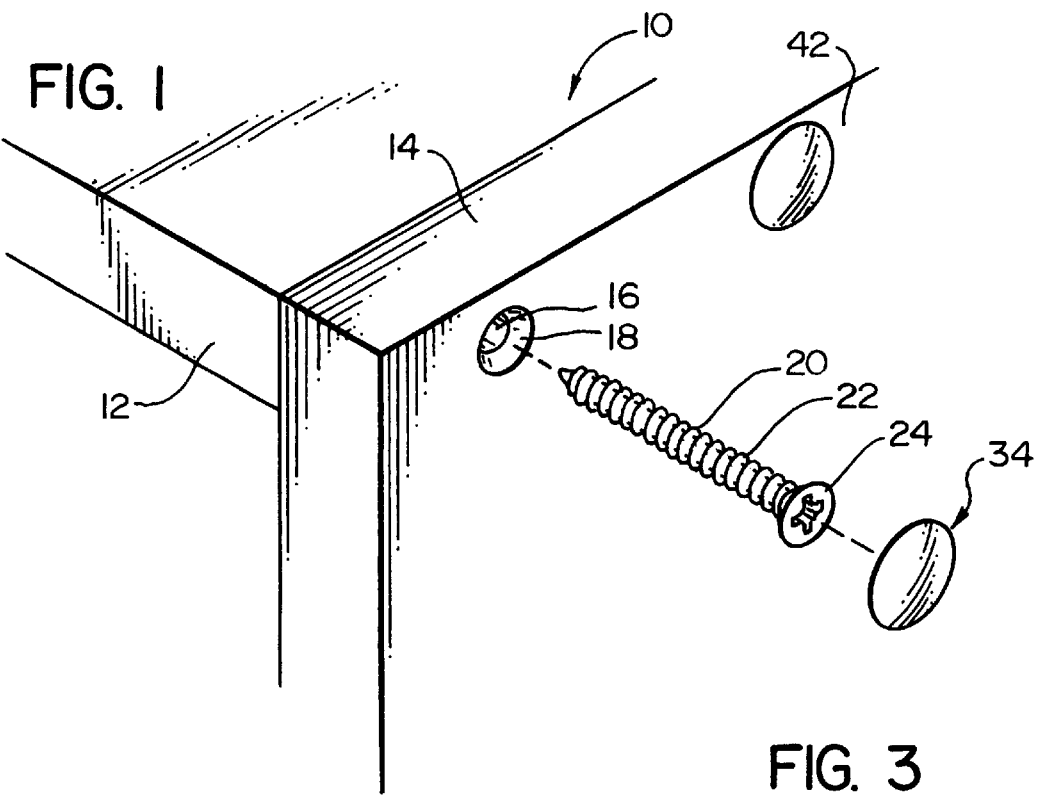
FIG. 1 is an isometric view showing a corner portion of a wooden article, where two panels of the article are being Joined together in accordance with the prior art method where the screw is being inserted and a prior art cap is to be inserted over the exposed head oh the screw.

In FIG. 1, there is shown a corner portion of a wooden structure 10, which comprises two panels 12 and 14 which are positioned to be securely fastened to one another. There is shown one of a number of screw holes 16 which has a countersunk recess 18 adjacent to the surface of the panel 14. There is shown a screw 20 which is to be inserted into the screw hole 16, and this screw comprises a threaded shank 22 and a countersunk screw head 24.

Figure 3:
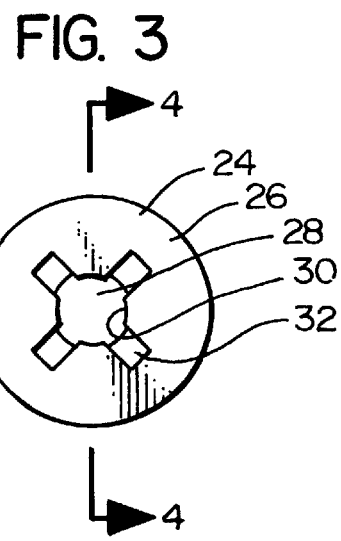
FIG. 3 is a view of the exposed surface of the head of the screw, drawn to an enlarged scale and showing the Philips head recess of the screw more clearly.

As can be seen in FIG. 3, where the screw head 24 is drawn to an enlarged scale, the exposed flat surface 26 of the screw head has a Philips head recess 28. This recess 28 comprises a center nearly circular portion 30, and four slot like, radially positioned recesses 32, arranged at right angles to one another.

The conventional prior art cover cap is shown at 34, and this comprises a dome shaped cover portion 36 and a mounting peg 38 which is centrally located at the concave surface of the cover portion 36 to extend outwardly therefrom. The cover portion 36 has a somewhat flattened surface at its perimeter portion 40, and in the covering position, this perimeter portion 40 bears against the panel surface 42. The mounting peg 38 has a central cylindrical portion 42, and four generally triangular shaped fins or connecting flanges 46.

Figure 4:
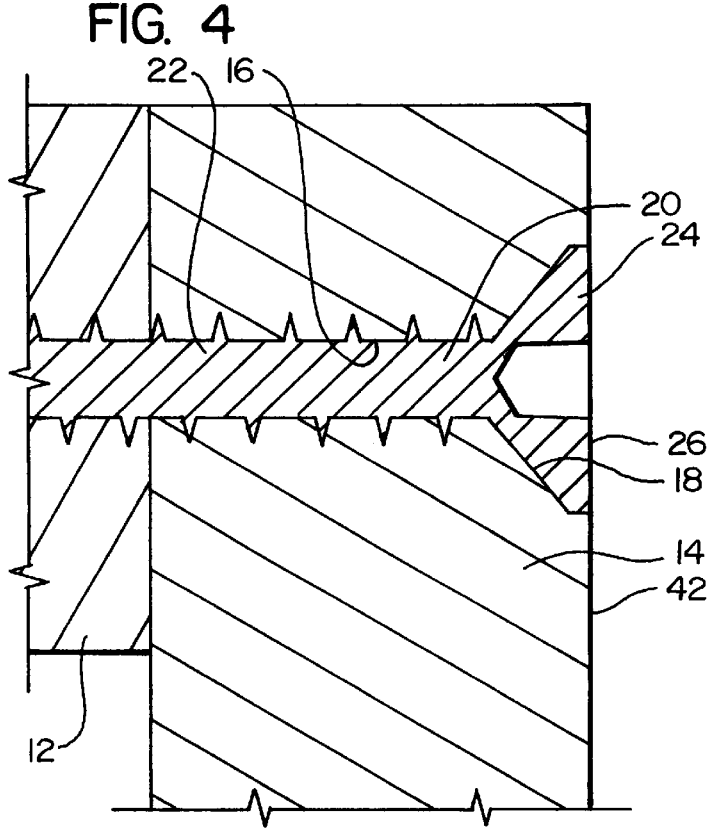
FIG. 4 is a sectional view showing the screw inserted into the two panel sections shown in FIG. 1, with the sectional view being taken along the plane indicated at 4—4 in FIG. 3.
Figure 5:
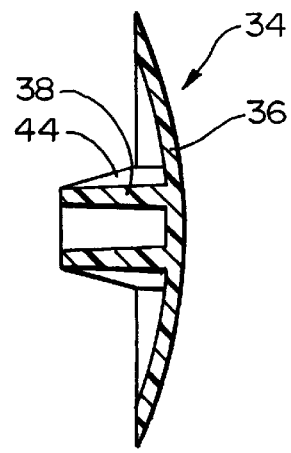
FIG. 5 is a cross sectional view of the prior art cover cap, taken along line 5—5 of FIG. 2, with a cover cap being positioned to be placed over, and in engagement with, the exposed screw head.
Figure 6:
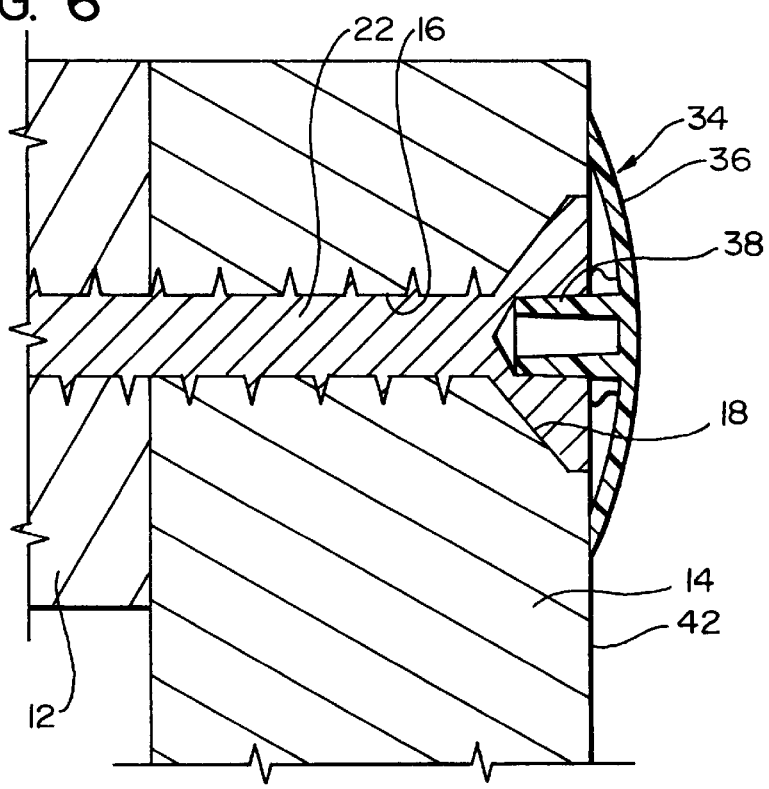
FIG. 6 is a view similar to FIG. 4, but showing the cap of FIG. 5 in its covering position over the screw head.

To illustrate the manner in which the cover cap is placed in its covering position, reference is now made to FIGS. 4, 5 and 6.

In FIG. 4, there is shown the two panels 12 and 14, and the screw 20 has already been inserted in the screw hole 16. It can be seen that the screw head 24 is positioned in the countersunk recess 18, and the exposed surface 26 of the screw head 24 is flush with the adjacent panel surface 42. The cover cap 34 is positioned to be placed over the screw head 24.

The placement of the cover cap 34 is accomplished by aligning the fins with the slot like recesses 32 in the screw head 24, and then moving the cover cap 34 toward the screw head 24 and pressing the cover cap 34 toward the screw head 24 so that the fins 44 become wedged in the slots 32. Thus, the cover cap 34 is held in place by the frictional engagement of the fins 34 positioned in the recess slots 32.

FIG. 6 shows the cap 34 in its covering position. It can be seen that the dome shaped cover portion slopes up from the adjacent panel surface 42. In reviewing the operation of placing the cover cap 34 after it is positioned as shown in FIG. 5, the cap 34 must be pressed firmly to cause the proper frictional engagement of the peg 38 in the Philips head slow 28.

Figure 7:
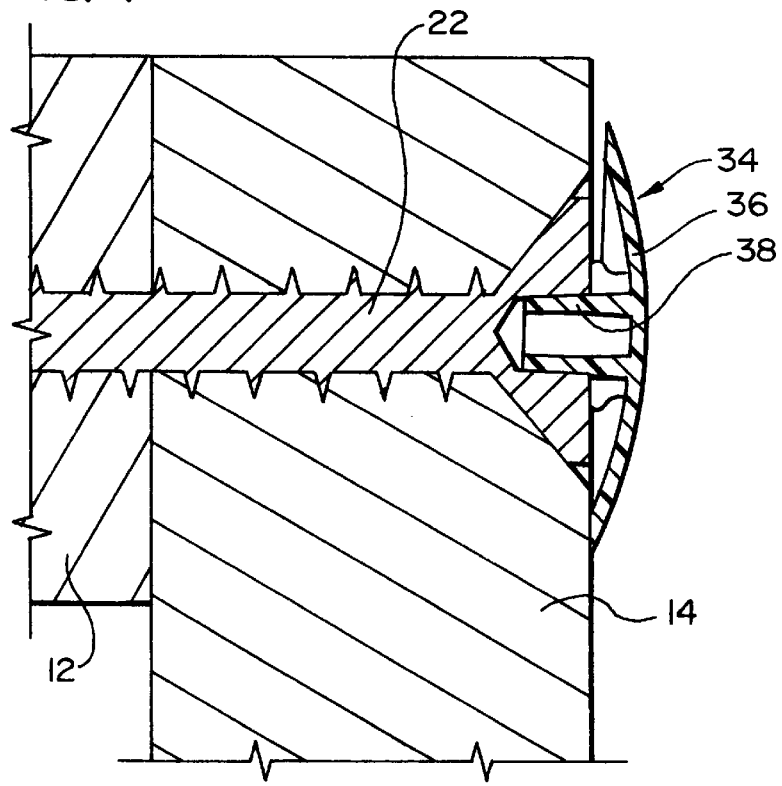
FIG. 7 is a sectional view similar to FIGS. 4 and 6, showing the cap tilted slightly out of proper covering alignment, to illustrate one problem with the prior art method.

Reference is now made to FIG. 7 which is a drawing rather similar to FIG. 6, except it can be seen that the cap 34 is tilted out of its proper covering position. This can happen for a number of reasons. One is simply the inadvertence on the part of the person in not applying the force centrally against the cap, so that one side of the peg 38 is out of proper engagement. This could result when the cap 34 is in a less accessible location. For example, the screw may be positioned in the back part of a sidewall of a kitchen cabinet so that the person has to reach in and extend his or her arm into the back part of the cabinet interior.

Figure 8:
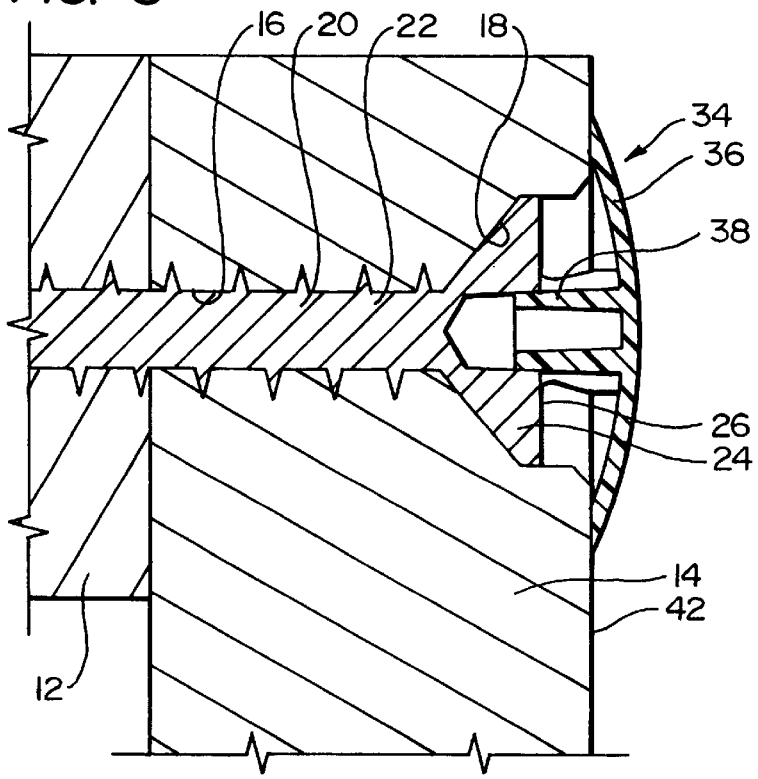
FIG. 8 is a view similar to FIG. 7, showing the cover cap being placed over the screw head when the screw-head is positioned at a deeper location in the countersink hole, this being done to illustrate another problem with the prior art method.

Reference is now made to FIG. 8, which illustrates another problem with the prior art cap. It sometimes happens that when the countersink 18 is being drilled, the countersink drill tool descends a slight distance too far into the panel 14 so that the countersink recess 18 is deeper than it should be. The result is that when the screw 20 is being rotated into its position of firm engagement with the panels 12 and 14, the screw head 24 becomes positioned so that its exposed surface 26 is spaced inwardly from the plane of the adjacent panel surface 42.

When the person applies the cap 34 against the panel surface 42 at the location of the screw head 24, and then exerts the normal force, for example with the person's thumb, while this would be sufficient to press the cap cover 26 firmly against the surface 42, it would not be great enough to flatten the cap to cover the mounting peg 38 to come into proper frictional engagement in the Philips head recess 28. More specifically, the slanted fins 46 do not penetrate deeply enough into the recess so that there is not the proper frictional engagement. The result is that the cover cap 34 is not properly secured, and quite often will even fall out. To remedy the situation shown in FIG. 8, the person will apply a substantially greater force against the cap 34, such as tapping it with a hammer to flatten the dome shaped cover 36 and thus press the peg 34 deeper into the recess 28. As indicated above, to the best knowledge of the applicant, this has been the common procedure for at least several decades.

b. Description of the Preferred Embodiment of the Present Invention

Figure 9:
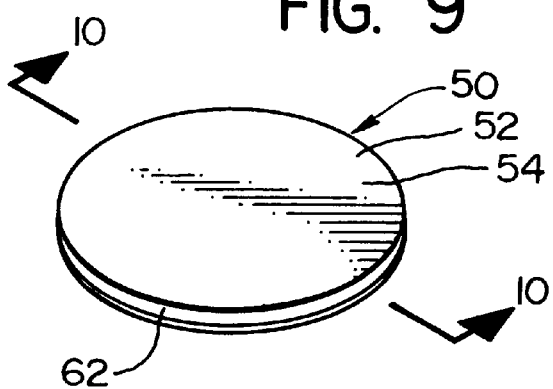
FIG. 9 is an isometric view of a cover piece of the present invention.
Figure 10:
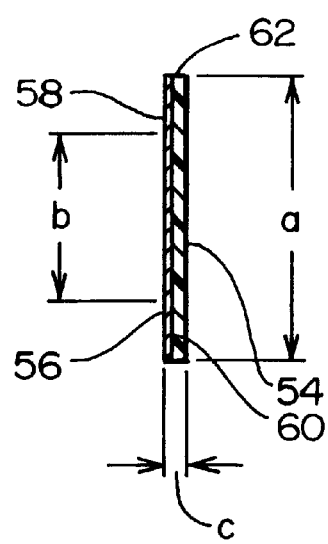
FIG. 10 is a sectional view taken along line 10—10 of FIG. 9.

Reference is first made to FIGS. 9 and 10, where there is shown the cover piece 50 which is employed in the present invention. This cover piece 50 comprises mainly a circular flat piece of cover material 52 having an exposed surface 54 on one side, and a contact surface 56 on the other side. There is a thin adhesive layer 58 applied to the contact surface 56.

The cover piece 52 has a predetermined diameter (indicated at "a" in FIG. 10), which is moderately larger than the diameter of the countersink opening which the cover piece 52 is intended to cover. The diameter of the countersink opening is shown approximately at "b" in FIG. 10. Thus, the cover 50 has a perimeter portion 60 which is an annular portion having a radial width dimension moderately greater than that of the central portion of the cover 50. The cover piece 50 has a perimeter edge portion 62.

Figure 11:
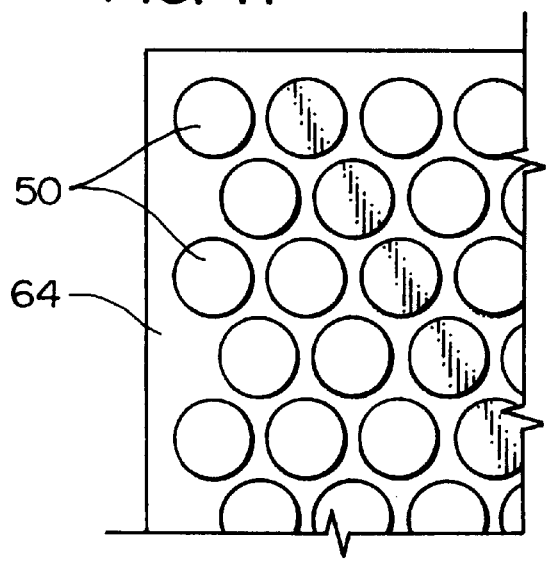
FIG. 11 is a plan view illustrating a plurality of the cover pieces positioned in bonding engagement with a carrying card or sheet, in the manner that the cover pieces can be easily removed from the card or sheet and be placed in their operative covering position.

The cover pieces 50 can conveniently be provided in the manner shown in FIG. 11, where there is a mounting sheet or substrate 64 which can be a moderately stiff piece of paper or possibly a thin piece of flexible cardboard. The cover 50 is releasably bonded to the substrate 64 by having its adhesive contact surface 56 in contact with the substrate 64.

The cover piece 50 can be removed rather easily from the sheet or substrate 64 simply by lifting one edge portion of the cover piece 50 and peeling it off the sheet or substrate 64.

Figure 12:
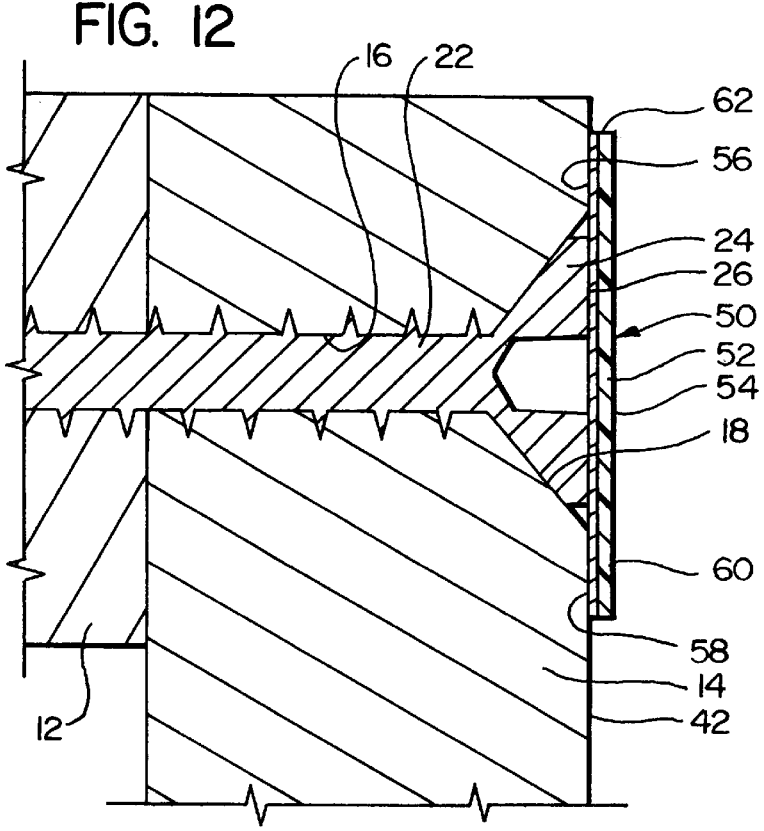
FIG. 12 is a sectional view, similar to FIG. 4, showing the screw in place, with the exposed surface of the screw head flush with the surrounding surface of the panel, but with the cover piece of the present invention in place.
Figure 13:
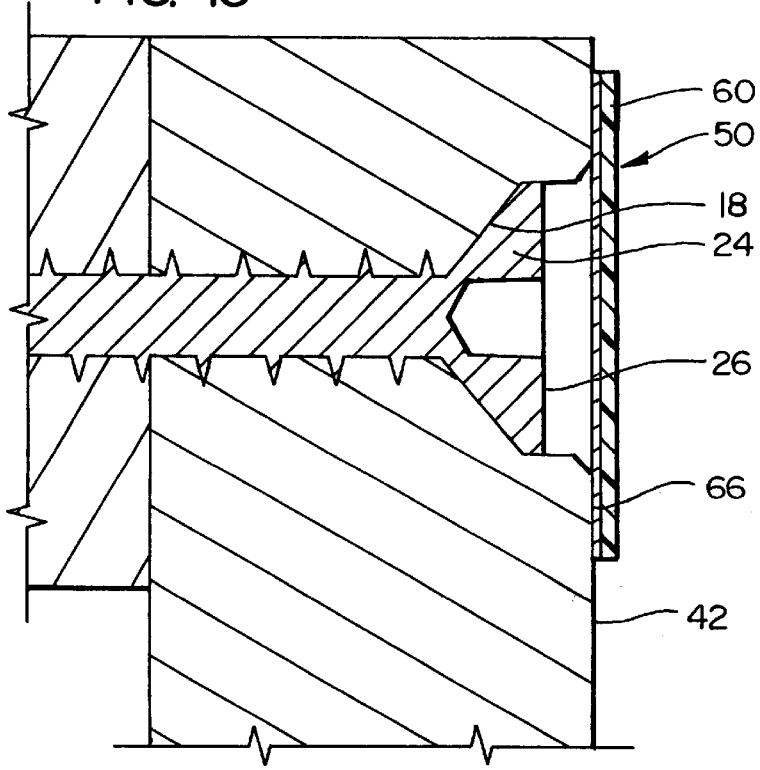
FIG. 13 is a view similar to FIG. 8, showing the situation where the screw head is positioned at a lower location in a deeper countersink recess, but with the cover piece of the present invention in place.

The application of the cover piece 50 to the panel 14 to cover the screw head 24 is illustrated in FIGS. 12 and 13. Quite simply, a single cover piece 50 is peeled off the sheet 64, and then moved into a position where it is properly oriented relative to the screw head 24, and then moved into its covering position onto the portions of the panel surface 42 surrounding the countersink opening 18 and also against the exposed surface 26 of the screw head 24. The adhesive layer comprises a strong contact adhesive which quickly forms a secure bond to the adjacent portions of the panel surface 42 and also to the exposed surface portion 26 of the head 24.

FIG. 13 represents the situation where the countersink recess 18 is formed more deeply than it should be, so that the exposed surface 16 of the screw head 24 is positioned below the panel surface 42. In this instance, the cover member 50 is applied to the panel 42 by being positioned adjacent to the screw head 24 and is then pressed into place. The cover piece is sufficiently stiff so that the perimeter portion 60 is pressed firmly against the adjacent portions 66 of the panel surface 42, and is securely bonded thereto.

The cover material itself 52 can flex to some extent, but it is relatively hard, and is made of a sufficient thickness (e.g. 0.02 to 0.03 inch) so that it does not deflect into the gap 68 that is formed by the exposed surface 26 of the head 24 and the cover piece 50. Further, it has been found that there is a fully adequate amount of adhesive surface area around at the entire perimeter cover portion 60 so that the cover piece 50 is bonded reliably to the panel surface 42.

In one specific embodiment of the present invention, the cover itself 52 is made of solid polyvinylchloride (PVC) having a thickness dimension of 31/1000ths of an inch (0.031"). This material, with this thickness, is such that while it is somewhat resilient and can be bent out of its planar configuration by ten or twenty degrees, or possibly up to thirty or forty degrees, depending o the force applied, it has sufficient rigidity and resilience so that it will return to its planar configuration. Also, it is sufficiently rigid so that in the situation shown in FIG. 13, the cover 50 remains reliably positioned in a planar configuration over the countersink opening 18 and has no tendency to deflect into the gap between the cover piece and the screw surface 26.

It should be pointed out that adhesively mounting pieces to a sheet has already been used in the prior art in other products. For example, small circular pads (often used as stop members and made of a felt material bonded to a piece of thin sheet material and having an adhesive surface on the sheet material) are mounted this way. This particular method of adhesively mounting a plurality of pieces has been found to be particularly effective in providing a mounting system for the cover pieces 50, as shown in FIG. 11.

One of the quite desirable features of the present invention is that it is a relatively simple matter to match the cover member 52 with the appearance of the surface 42 of the structural component to which the cover piece 50 is applied. In some instances, the surface 42 of the wooden panel or member is simply the natural wood surface which would usually be painted or have a lacquer applied thereto. However, in a great number of instances, the wood panel or component has a wood veneer surface, or a synthetic cover material.

If the veneer layer is made of a synthetic material, then it is a simple matter to match this material simply by making a sheet of material of a similar color in the desired thickness of the cover piece 50, and then stamping out the circular cover portions 52. If the veneer layer is made from wood, then this same type of veneer layer could be made of the desired thickness, and the circular cover pieces 52 could be stamped out. There is existing machinery which can stamp out these circular pieces with a well defined and relatively smooth edge.

In those instances where the wood surface 42 is a natural wood surface, then it is within the present skill of the art to provide thin sheets of material which can closely simulate this wood surface, and again the circular cover pieces 52 can readily be stamped out.

With regard to the adhesive layer 58, it is found that a suitable adhesive for the present invention is a pressure sensitive adhesive which can be an acrylic transfer glue.

Another desirable feature of the present invention is that the cover pieces 50 will in most all instances reliably stay in place when placed in the covering position. The edge dimension "c" is very small, and it has found that even relatively severe contact made by a right angle edge of a steel piece against the edge surface 62 does not start a peeling action of the cover member 50.

On the other hand, if the cover member 50 is improperly placed in a covering position, or if some other mistake is made so that it would be desirable to remove the cover member 50, this can be done by sliding a knife edge under the edge surface and thus removing the cover member 50 without a substantial amount of force being applied.

Also, it has been found that it does not require any significant amount of dexterity for the person to properly accomplish the application of the cover pieces 50. On the contrary, the applicant has found that in those instances where he had people use the cover piece of the present invention, they had no difficulty in properly centering the cover piece 50 and making the proper application.

One of the desirable features of the present invention is that the cover piece can rather conveniently and quickly be proper centered over the screw surface and applied so that the cover piece is properly centered relative to the screw surface. This is illustrated in FIGS. 14 through 16. In FIG. 14, it can be seen that the person who is applying the piece has positioned the cover piece 50 so that an edge portion of the cover piece is spaced laterally from the screw head surface a short distance, and the cover piece is tilted upwardly at possibly 45°, or possibly at an angle closer to a right angle to, or further from, the adjacent surface. The cover piece 52 is sufficiently stiff so that it does not deflect to any great extent when held in this position, but in the preferred construction, the cover piece does bend when a moderate downwardly force is applied by the person's forefinger, at a middle location, while the thumb engages the edge as shown in FIG. 15. It is a relatively simple task for the person to observe the position of the cover piece as shown in FIG. 14 and estimate rather closely the proper distance of the edge of the cover piece 50 that is pressed onto the adjacent surface from the adjacent edge of the screw.

Then, as shown in FIG. 15, the person simply rotates the cover piece downwardly until it is positioned nearer to the screw surface, with the cover piece 52 bending to some extent. In doing this, the person is still able to view the location of the opening or recess 18, relative to the cover piece 50, and to make adjustments before there is substantial engagement of the adhesive surface of the cover piece 50. Then as the person moves his thumb away, the cover piece snaps down into position where it is immediately pressed into its proper adhering position covering the screw. It has been found that in a very short time (a minute or so), a person can become reasonably adept in applying the cover pieces 52 rather quickly and reliably.

To evaluate the desired characteristics of the cover piece 50 of the present invention, certain tests of the cover piece of the present invention were conducted to determine how these characteristics relate to the ability to properly utilize the cover piece to accomplish its intended function. This requires obtaining objective (quantifiable) data on the PVC sheet material which is used to manufacture the present commercial embodiment of the present invention as it relates to flexibility and hardness for the purposes of comparing material to various polymer based sheet materials.

To accomplish this, as a first step, the characteristics of the PVC material used in the preferred embodiment of the present invention were obtained from the manufacturer's material Material—Semi Hard PVC Barium/Dacium free stabilized.

Hardness—specified value is 75+/−2 shoreD per ASTM D2240-97

Density—between 1.4 and 1.5 per DIN 53479

Softening Temperature—between 81 and 83 degrees C per STM D1525

The second step was to find common mechanical characteristics with which to establish comparison data to other materials. This was determined to be the Hardness specification.

Figure 17:
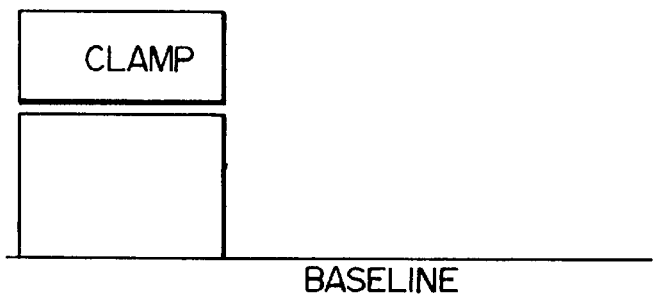
FIG. 17 is side elevational view of a test apparatus by which various materials related to the present invention were tested.
Figure 18:
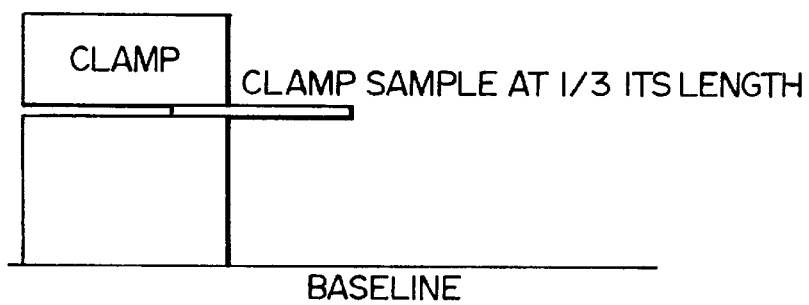
FIG. 18, shows the apparatus of FIG. 17 with a test sample inserted therin.
Figure 19:
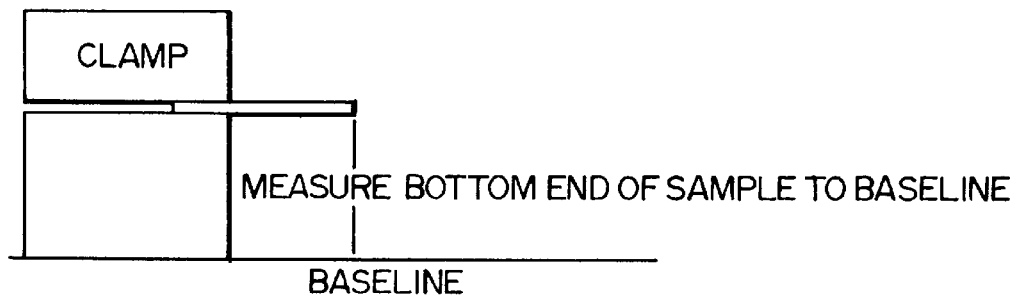
FIG. 19 substantially the same as FIG. 18, but illustrates the step of measuring the vertical distance with no deflection.
Figure 20:
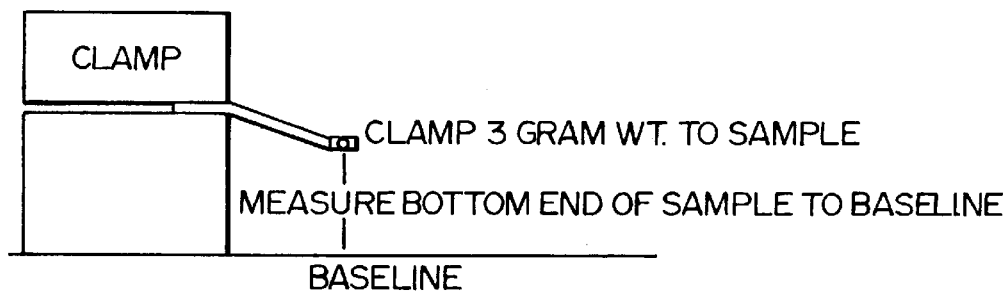
FIG. 20 is a view similar to FIG. 19, but showing a weight applied to the end of the test sample and a downward deflection of the same.

The third step was to establish test methods to provide flexural stiffness comparisons. The basis for these are ASTM D790-96 cm. The criteria for this test are as follows:

a—Material samples are all to be of common dimensions. For the purpose of this test the sample size is 2"×0.5"×0.020"

b—Material samples to be stabilized for 2 hours at 20 degrees C+/−2 degrees.

c—Establish a clamp fixture in the X axis and determine a baseline position (see FIG. 17).

d—Clamp each sample individually in the fixture with ⅓ of its length held in the clamp. The clamp must not compress the sample (see FIG. 18).

e—Measure the exposed end of the sample from its bottom edge to the baseline and record that reading (see FIG. 19).

f—Clamp a 3 gram load on the exposed end (within 0.250" of the end) and measure the sample from its bottom edge to the baseline and record that reading (see FIG. 20)

g—Subtract the reading of step "f" from step "e" and record the difference. This value is the Flexural reading for this sample. This value is shown in the summary data as the deflection and is recorded in inches.

Using the test procedure outlined above, nine different samples of material were tested. These are presented in the table shown in FIG. 21.

Samples 1, 2 and 3 are samples PVC sheet material utilized in commercial embodiments of the present invention. The stiffness values of the samples 1, 2 and 3 are somewhat different from one another, and it is reasonably surmised that this results from the colorants used in the processing of the material. However, they are very close to one another with regard to their stiffness characteristics.

Figure 22:
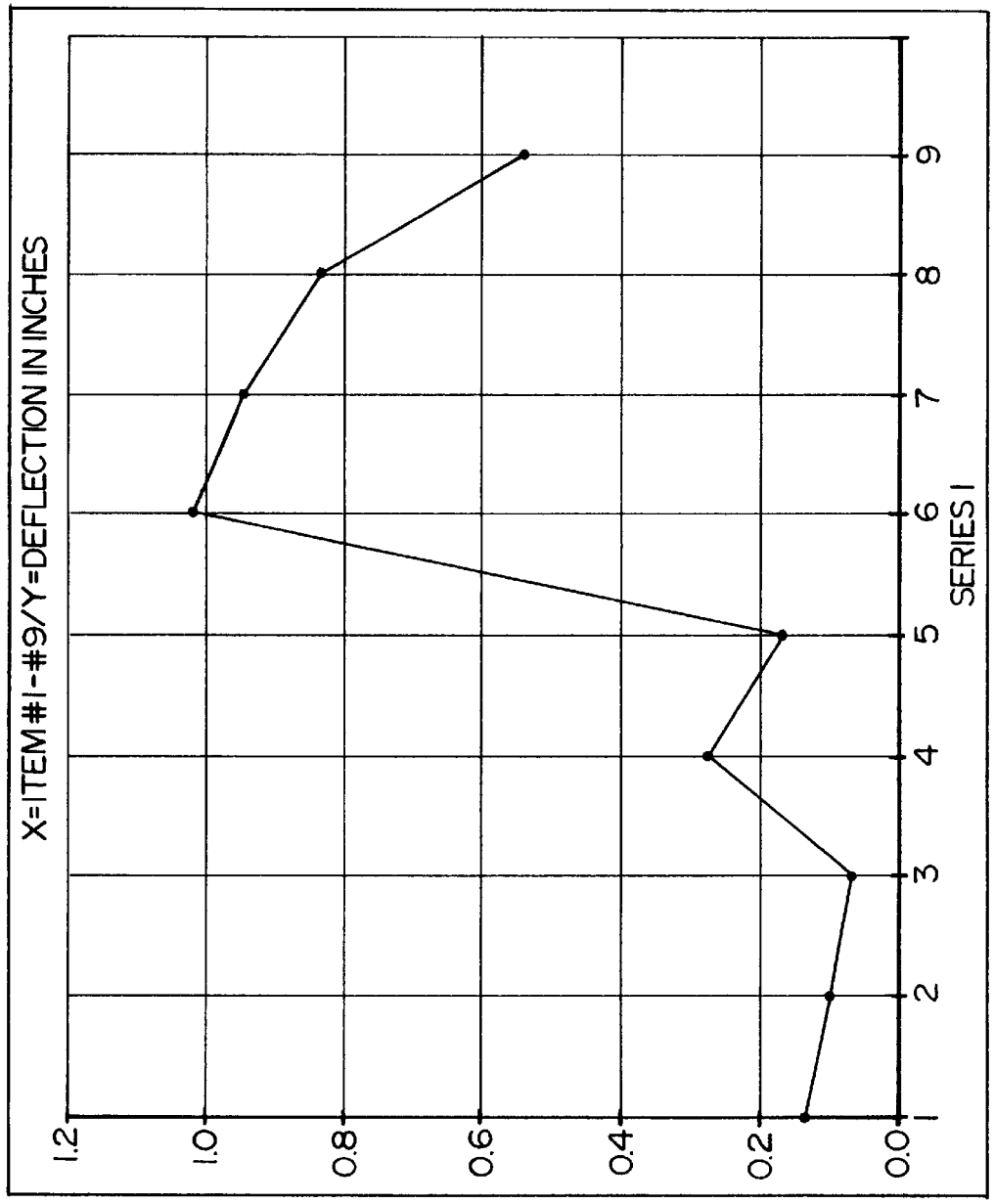
FIG. 22 is a graph showing the reference deflection values of the table FIG. 21.

Samples 4 through 9 are samples of TPE (Thermal Plastic Elastomer) materials which were chosen as flexible sheet polymer materials similar in character to PVC but with differing hardness (and therefore flex) characteristics. The table of FIG. 21 gives the deflection values for each of these. If the sample has a higher deflection value, that means the material is more flexible. A graph plotting these various deflection values is given in FIG. 22. These deflection values are in this patent application used as, "reference deflection values"; and when the term "reference deflection value" appears in the claims it is to define the stiffness of the member.

In interpreting these values, it should be kept in mind that each test sample is two inches long, and a third of the length of the sample ( i.e. two-thirds of an inch) is in the clamp. Therefore, one and one-third inches of the sample is extending beyond the clamp. To give a realistic presentation of how these deflections would appear in the actual test setup, reference is now made to FIG. 23. Along the vertical scale, there are markings representing the length in inches equal to the length of the test sample extending outwardly from the clamp (i.e. one and one-third inch). The horizontal length dimensions are given along the bottom of the graph of FIG. 3.

Figure 23:
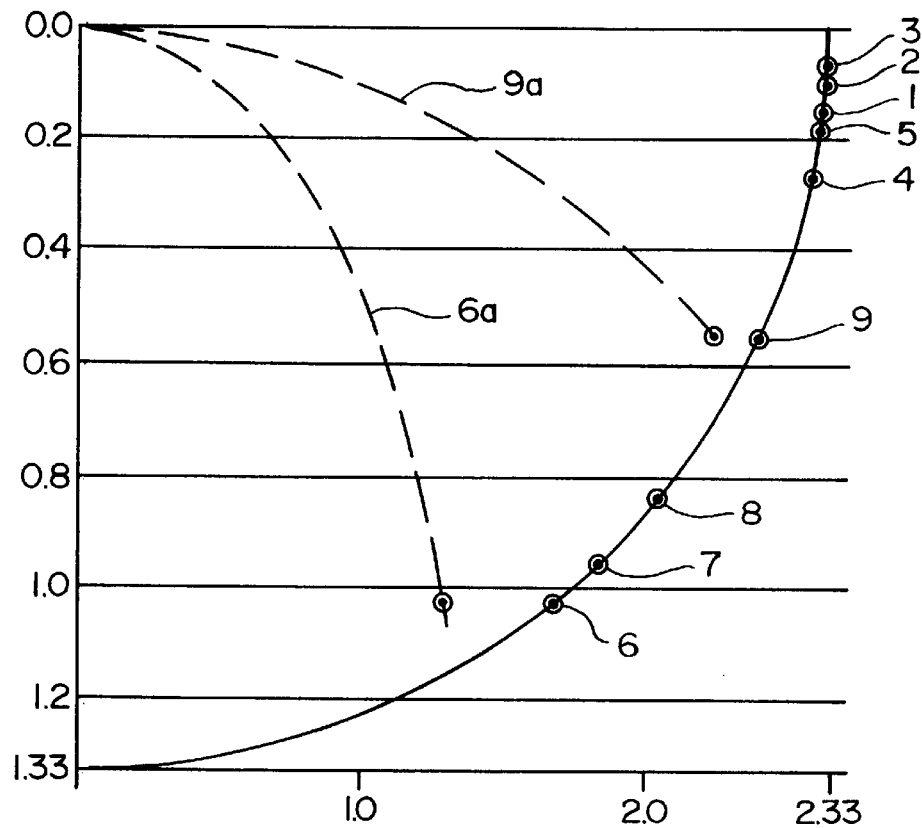
FIG. 23 illustrates the various deflection locations and also showing somewhat schematically the location of the end portions of the test samples relative to the test fixture.

Then a 90 degree arc was drawn using the top left corner point of the graph of FIG. 23 (marked "0.0") as the center of the arc, and the arc was extended 90 degrees from the horizontal all the way down to the lower left corner where there is indicated a 1.33 vertical dimension below the height of the test piece. The vertical deflections of the various samples are indicated along the length of the arc.

Thus, it can be seen that sample 3 (which is made in accordance with one of the preferred embodiments of the present invention) has the smallest deflection, while the other two samples made in accordance with the present invention have a slightly greater deflection. Since each sample has a uniform cross-section along its length, and since it is held rigid at only one end location, each sample acts in the manner of a cantilevered beam with a weight at the end. Thus, the degree of curvature is greatest at the mounting location where it is clamped to the test fixture, and the degree of curvature decreases in an outward direction.

Another factor to be considered is that as the sample deflects further downwardly, the weight at the end of the text sample is moved closer to the vertical line at which the clamping end of the test fixture is located. Thus, the lever arm about which the force of gravity acts relative to the test specimen becomes shorter with greater downward deflection. In FIG. 23 there is a drawn a first broken line indicated at 6a which would approximate the curvature of sample 6, and the line 9a approximates the curvature of the sample 9.

The next step was to cut out cover pieces from the samples in the same size and shape as the cover piece 50, and determine how these functioned in being used in the present invention. This was done as follows: Samples of the material which were used for the test samples 4 through 9 had circular discs of a nine sixteenth diameter cut out, this being the diameter of the preferred embodiments of the cover pieces 50 of the present invention. Each of these cover pieces 1 through 9 had an adhesive layer applied to one surface. The actual commercial embodiments (utilizing the material in samples 1, 2 and 3) were used in the test. In discussing the results that were obtained, these cover pieces will be referred to as cover piece 1, cover piece 2, etc. up through cover piece 9, with these numerical designations corresponding to the identification of the sample of material from which the cover pieces were cut. Then a wood board was placed on a table, this board having a screw inserted therein with the head of the screw at or very close to the level of the upper surface of the wood piece. The inventor and four other people participated in the testing.

Each of the nine cover pieces was taken in hand and was applied in the manner described with reference to FIGS. 14 through 16 to place the cover cap over the opening. Each of the three samples 1–3 of the present invention were found to react substantially the same with regard to the manner of application. In other words, the cover piece was positioned with one edge adjacent to the edge of the opening, but a short distance therefrom, with the cover itself being aligned with the opening. Then with the thumb and forefinger position is indicated in FIG. 14, the cover piece was rotated and moved downwardly toward the position of FIG. 15. Then the thumb was moved away from the cover piece to permit the cover piece to snap into its covering position against the surface of the wooden plank, and covering the opening. The three cover pieces 1, 2 and 3 functioned quite well as described previously with reference to FIGS. 13–15.

The cover pieces 4 and 5 were found to function nearly the same as cover pieces 1 through 3. The cover piece 9 functioned somewhat in a manner similar to the present invention, but it was more difficult to place.

Cover pieces 6, 7 and 8 were found to operate rather poorly, in that the alignment was more difficult to adjust and the "snap action" where the cover piece coming into engagement with the wood surface was in large part either almost entirely absent or at least substantially degraded. This will be explained further later herein.

Then for purposes of comparison, a further test was conducted using the commercial cover piece described in the background of invention and a similar cover piece made of the material used in the commercial embodiment of the present invention. Material was not readily available which closely simulated the stiffness characters of the cover piece of the prior art. Therefore the test described above using the 2"×0.5"×0.020 samples could not be performed. However, in manually handling and bending this prior art piece back and forth, it was very apparent that this prior art cover piece was more flexible than the most flexible cover piece (i.e. cover piece 6) that had its material tested as indicated above. The cover piece of the prior art was found to have essentially the flex characteristics of a normal adhesive tape.

A somewhat different comparative test was done using a disc made of the same material as sample number 1 (as described above), and this disc was 0.75 inches in diameter, since the diameter of the piece of material of the prior art cover piece was also 0.75 inches. The 0.75 inch diameter cover piece of the material used in the embodiments of the present invention was clamped in the test fixture so that half of the circular cover piece was in the test fixture, and the other half was extending from the test fixture a distance of 0.375 inch. Then the 3 gram weight was hung from the end of this test piece using the material of the preferred embodiments of the present invention, and there was a downward deflection of 0.035 inch.

The same test was conducted using the prior art cover piece, and the downward deflection was found to be about 0.42 inch. Thus, the actual downward deflection is slightly greater than the original length (i.e. 0.375 inch) of the portion of the prior art piece extending out of the test fixture. It is surmised that when the 3 gram weight was applied, there was actually some stretching of the material of the prior art cover piece.

Figure 24:
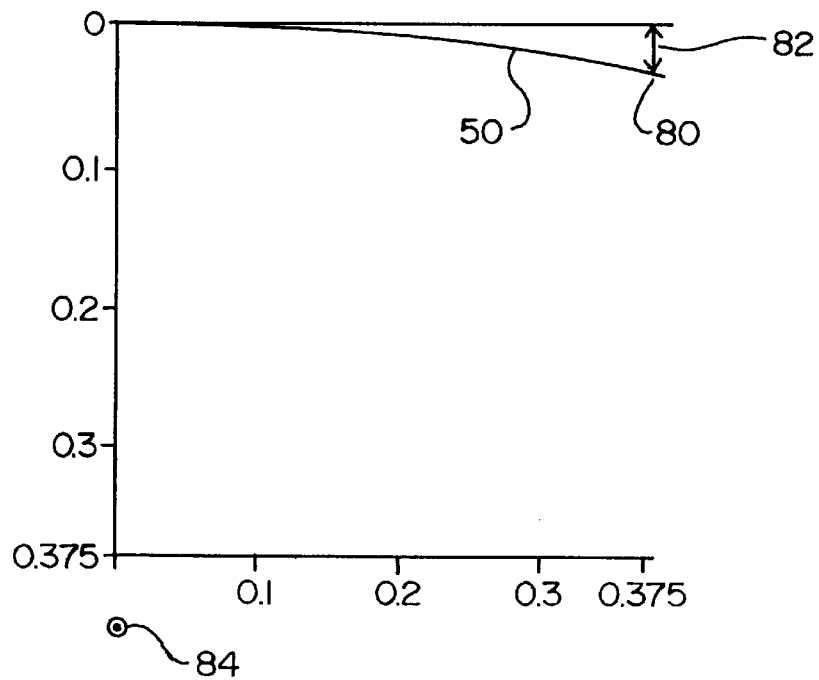
FIG. 24 is a view similar to FIG. 23, illustration the deflections in another test perfomed in connection with the present invention.

Reference is now made to the graph of FIG. 24, and the cover piece 50 of the present invention is indicated at 50. The downward deflection at the end 80 where the 3 gram weight is positioned is indicated at 82. The location of the 3 gram weight attached to the end of the prior art piece of material is indicated at 84, which is below the lowest level of the graph by a short distance, thus indicating the material was actually stretched. To place this in a practical perspective, it should be pointed out a weight of 3 grams is equal to about one sixteenth of an ounce. Thus, it can be appreciated that a very small force is required to cause the prior art cover piece to bend about a very short radius (almost a zero radius) a full 90 degrees.

Figure 25:
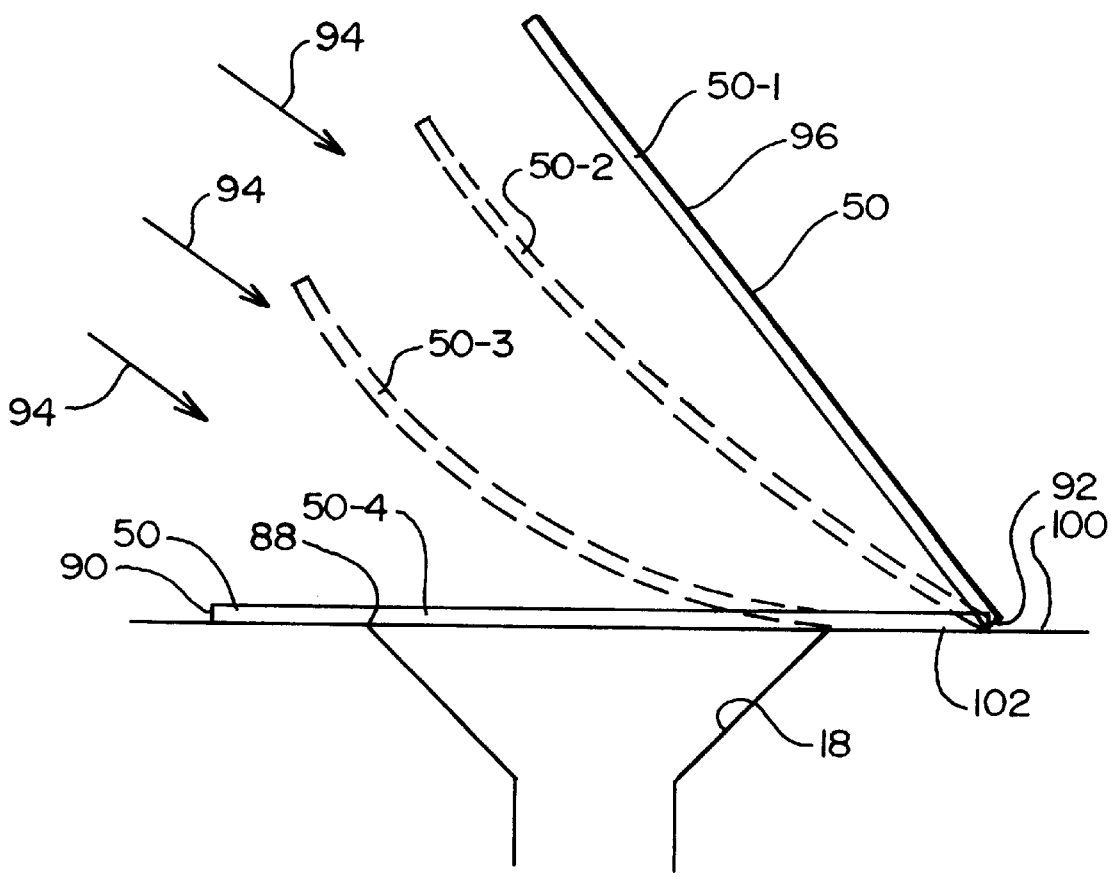
FIG. 25 is a side elevational view, drawn to an enlarged scale, showing the cover member of the present invention in four different positions as it is being applied to the structure surface to cover the surface opening.

To discuss further the operation of the present invention, reference is now made to FIG. 25 where the cover piece 50 and the opening 18 are drawn to an enlarged scale. The upper perimeter edge portion of the opening 18 is designated at 88, and the outer perimeter of the cover piece 50 is designated 90. In FIG. 25, the cover piece 50 is shown in four stages. The first stage is indicated at 50-1, the second at 50-2, the third 50-3 and the final stage where the cover piece 50 is positioned and located in this covering position is indicated at 50-4.

To apply the cover piece, the initial task is to position the cover piece 50 at a location adjacent to the opening 18 where both the piece 50 and the opening 18 can be observed by the person and where the piece 50 can be moved downwardly to its covering position while providing the observer with sufficient visibility to make sure that the piece 50 is properly centered over the hole 18.

The experience of the inventor and of those who are known by the inventor to use the cover piece 50 of the present invention in the application of the cover piece 50 has indicated that this is best accomplished by placing the piece 50 in a manner that one edge portion indicated at 92 is positioned at the far side of the opening 18 relative to the location of the person performing the operation. The line of sight of the person is indicated by the several arrows at 94. In describing method applying the cover member with reference to FIG. 25, the term "forward" will be used to refer to a direction extending from the contact location 92 to the left (as seen in FIG. 25), and the term "rearward" will denote the opposite direction.

The piece 50 initially is positioned to be tilted to upwardly at a desired angle, and as shown in FIG. 25 this angle at the cover piece location 50-1 could desirably be between about 30 to 65 or 75 degrees from a horizontal plane. As shown in FIG. 25, the slant of the cover piece at position 50-1 is about 55 degrees. The edge 92 is positioned at the desired location which would be as close a possible to the proper perimeter location of the cover piece 50 when it is in its properly centered covering position. Also, the cover member 50 is positioned so that a diameter line drawn from the contact location 92 through the center of the cover piece 50 would lie in the same vertical plane as the line drawn from the contact location 92 through the center of the hole 18. Thus, if the cover member 50 is moved downwardly while maintaining the same alignment, the cover piece 50 would be properly positioned over the opening 18.

As shown in FIGS. 14, 15 and 16, the person would normally grasp the cover piece 50 near the edge portion 96 of the cover piece 50 at a location diametrically opposed to the contact area 92. The cover piece would then be positioned at location 50-1 in FIG. 23. Then person's forefinger would be pressed against the upper surface of the cover member 50 at or near an approximate center location, indicated at 98, and the person's thumb would be positioned at the edge portion 96.

As a cover piece 50 is moved from the position 50-1 to the location of 50-2, the person begins to push with greater force downwardly and forwardly at a center location 96 of the cover piece 50, and upwardly and rearwardly at the end location 98. Thus, at the location 50-2 the cover member has begun to bend. This motion continues, and as the person presses the cover member 50 further downwardly toward the position at 50-3, generally greater force is applied, and the bending of the cover piece 50 increases. In the position of 50-3 it will be noted that a rear portion 102 of the cover piece has been moved downwardly to where at least part of it is positioned flat against the surface 100. In this position of 50-3 of the cover member there is both frictional engagement of the cover piece portion 102 with the surface 100 and also the contact adhesive resists separation and to some extent lateral movement of the cover piece portion 102 from the surface 100. Further, as the cover member 50 is moving from the position of 50-2 to the position of 50-3 the person is better able to estimate the accuracy of the location of the cover piece 50 so that it will, in its final covering position, be as close as possible to be concentric with the opening 18.

If during that period when the cover piece 50 is between the position of 50-2 and 50-3 there is some misalignment, if the flat contact area of the cover piece portion 102 is sufficiently small, then small lateral adjustments are rather easy. If there is greater surface contact of the cover piece portion 102 it may be desirable to lessen the forces on the cover piece 50 to permit the cover piece 50 to spring upwardly, and then the person could make a lateral adjustment.

Assuming that the alignment of the cover piece 50 at the location of 50-3 is properly positioned, then at the approximate location indicated at 50-3, the person slides his thumb upwardly on the forward edge 98 to release the edge 98. The downward force exerted by the person at the center location 96 immediately causes the cover piece 50 to snap down into its covering position at 50-4.

When the tests of applying the cover pieces 1–9 were performed, it was found that this method could be performed with only marginal effectiveness with sample 9. This method would not be successfully applied with samples 6, 7 and 8. Rather to make position adjustments, it was generally necessary to peel the cover piece off, then reposition it and start the process over again.

Figure 26:
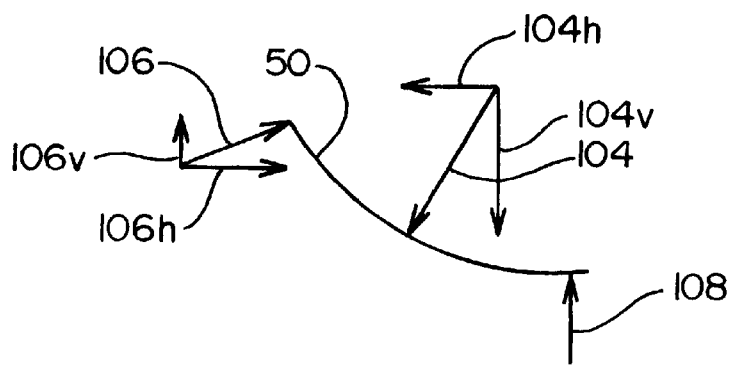
FIG. 26 is schematic view illustration the force components applied to the cover member when it is in approximately the poistion of 50-3 of FIG. 25.

To analyze further the operation of the present invention, reference is made to FIG. 26 which illustrates the forces exerted on the cover piece 50 which is shown schematically as a curved line approximating the curvature indicated at 50-3 in FIG. 25.

The downward and forward force exerted by the person's forefinger is indicated at 104, and the rearward and somewhat upward force exerted by the person's thumb is indicated at 106. The resultant force at the location of the contact portion 102 of the cover piece 50 is indicated at 108. For purposes of analysis, let us break of each of these forces up into its horizontal and vertical force components. The force 104 has a horizontal component 104$h$ and somewhat larger vertical component 104$v$. The force 106 has a relatively small vertical component 106$v$ and a larger horizontal component 106$h$. The force 108 is showing as being exerted vertically, with no lateral component. It is to be understood, of course, that this is something of an idealized illustration, and as a practical matter there may be some amount of lateral force, either forwardly or rearwardly, possibly along with a lateral force component. However due to the frictional engagement of the cover portion 102 with the surface 100, and the effect of the adhesive, there would usually be no resulting movement of the cover piece portion 102 over the surface 100 unless the person deliberately exerts a lateral force to rotate the piece 50 laterally.

Since the vertical and horizontal force components should balance, the vertical force component 104$v$ should equal the sum of the force 106$v$ and the force 108. Further, the horizontal force 104$h$ should equal the horizontal force component 106$h$.

Figure 2:
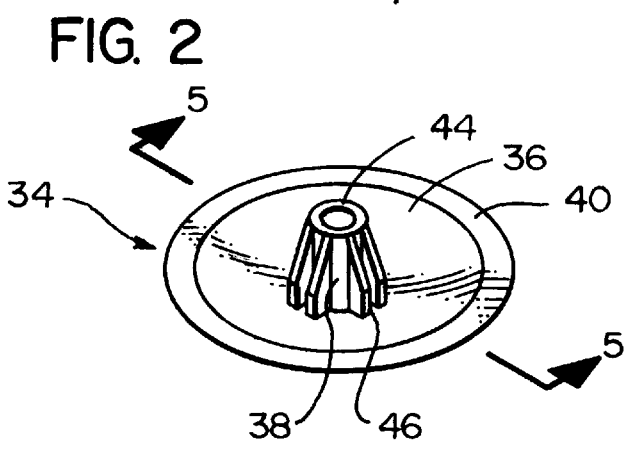
FIG. 2 is an isometric view of the cover cap shown in FIG. 1.

Thus, it can be recognized with the cover piece 50 at the location of 50-3, by relaxing the force exerted by the thumb and forefinger against the middle portion 96 of the cover piece 50, while maintaining the thumb engaging the forward edge portion 98, the resiliency of cover member 50 will cause the cover member 50 to move towards its position of FIG. 2, thus lifting the contact portion 102 out of contact with the surface 100. Or the cover piece 50 could be rotated upwardly with the same forces applied. This could be done if lateral or angular adjustment is needed. On the other hand, if at any position the force exerted by the forefinger at the central location 96 is increased (thus requiring the force exerted by the thumb at the edge location 98 to increase correspondingly), the cover member will bend more, to create an increase in the contact area of the contact portion 102 of the cover piece 50.

It has been found that as some people begin practicing putting the cover pieces of the present invention in place, in a short time they empirically begin to appreciate these relationship in properly centering and applying the cover pieces 50, and within a rather short time, the person is quite adequately adept in applying the cover pieces 50. The precise motion used will depend, of course, on the size of the person's fingers, the person's finger strength, and possibly other factors.

To summarize the usual and preferred method of application, after the person has made initial contact of the edge portion 92 with the structural surface 100, the initial tilting of the cover piece 50 downwardly occurs with a lesser amount of force. As the cover piece 50 moves further downwardly, and the person is substantially satisfied with the position of the cover piece 50, then the person would normally begin applying more force to bend the cover piece 50 downwardly, lowering the front edge portion 98 to a lesser extent. The result of this is to establish the contact area of the contact portion 102 so that the positioning of the cover piece 50 is maintained. After this, the person safely releases his thumb from the front edge 98 and the cover piece 50 snaps downwardly into place.

Figure 27:
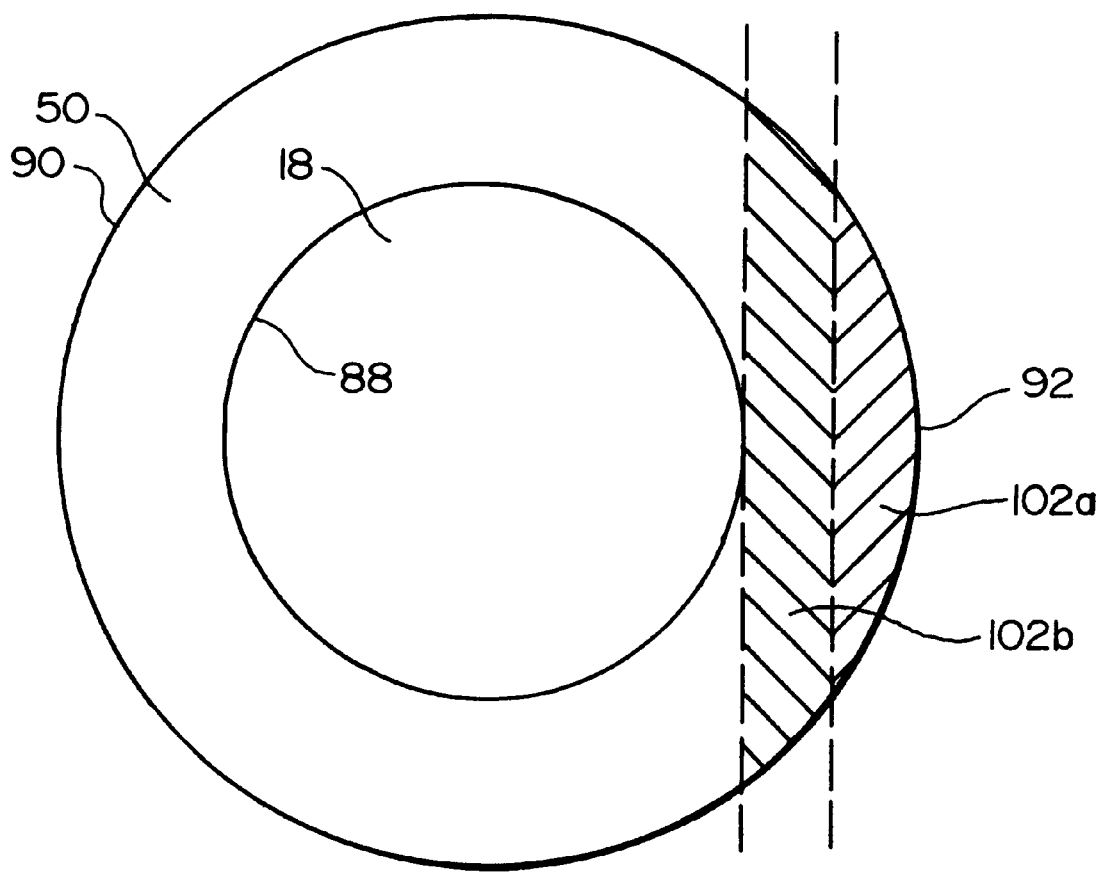
FIG. 27 is a schematic plan view looking downwardly on the opening to be covered and also showing the perimeter

To explain this further, reference is made to FIG. 27 which is a plain view showing the perimeter 88 of the opening 18 and the perimeter 90 of the cover piece 50 when it is perfectly concentric with the opening perimeter 88. The contact location 92 of the cover member 50 is also shown. In viewing the drawing of FIG. 27, let us assume that the cover piece 50 is at the position 50-2 (see FIG. 25) so that there is only point contact at the contact location 92. In that position, the proper alignment and positioning of the cover piece 50 is substantially entirely under the control of the person's thumb and forefinger.

Let us now assume that greater force is applied at the center location 96 and the edge location 98 so that there is sufficient bending of the cover piece 50 so that a relatively small cover portion 102a comes into surface to surface contact with the underlying surface (the smaller contact area 102a being indicated by the lines extending upwardly toward the right). This provides some surface contact, and it has been found that with this small amount of surface contact it is often not difficult to exert enough lateral rotating force between the thumb and forefinger to change alignment.

Then when the person is confident of the position of the cover piece 50, the person may immediately release his thumb from the cover piece 50 to cause the cover piece 50 to snap into place. Or greater force could be exerted by the forefinger against the middle area 96 to cause greater bending, thus increasing the contact area to include approximately the area indicated at 102b. It can be seen that with this greater overall increase in contact area, the frictional engagement and adhesive engagement is spread over a greater area, and because of the increased force, the total frictional and adhesive forces are increased. Then, the person is able to release the outer edge 98 and cause the cover member 50 to snap into place.

As a further experiment, a flat circular piece, the same size and thickness as the preferred embodiment of the present invention, was cut out of a steel sheet. This steel disc was applied to the surface of the wood structure in somewhat the same manner that cover member 50 of the present invention is applied. This steel disc of this size and thickness remained very rigid and substantially no bending took place as it was put into place. It was found that it was more difficult to properly position the steel disc in accordance with the method of the present invention, and that when the steel plate was brought to a position relatively close to the contact surface and it was desired to release the thumb from the front edge, the steel disc would often end up misaligned.

It is surmised that when a person is actually applying the forces of the thumb and forefinger there be some misalignment of the three forces applied against the cover member, one force being the resisting force applied by the ground engagement and the other two forces resulting from the application of the force of the thumb and the forefinger. In any event, when the thumb is released, the motion resulting from the application of the force of the forefinger results in some misalignment. Another possibility is that the visibility is obscured because it is not possible to bend the forward portion of the rigid steel disc out of the way, and this results in misalignment.

It is obvious that various modifications could be made in the present invention and still be within the broader scope of the present invention.

I claim:

1. A method of covering an exposed fastener in a structure where;
    i. the structure has a structure surface
    ii. a fastener, is positioned in the structure in a manner that there is a surface opening in the structure, said surface opening having a perimeter edge with a predetermined maximum edge to edge lateral dimensions; said method comprising
    a. providing a generally planar cover member comprising
       i. an exposed surface on one side and a contact surface on an opposite side, and a perimeter edge portion having lateral dimensions greater than corresponding lateral dimensions of the surface opening, said perimeter edge portion having a perimeter surface contact portion;
       ii. an adhesive material located at least at a perimeter contact portion of the contact surface;
    b. applying the cover member to the structure surface to cover the surface opening so that the perimeter portion of the cover member is properly positioned relative to the perimeter edge portion of the surface opening, and moving the cover member into engagement with the surface of the wood structure so that the perimeter contact portion of the cover member becomes bonded to at least a surface portion of the structure surrounding the surface opening;
    c. said cover member being sufficiently resistant to bending so that in the application of the cover member to the structure surface, with the cover member being positioned so that with a first edge portion of the cover member being located at a first location of the structure surface near the perimeter edge of the surface opening, a second portion of the cover member may be grasped in a manner to manipulate the cover member to cause enough force to be transmitted from the second portion through the cover member to the second portion of the cover member to press the first portion of the cover member into engagement with the surface structure at the first location so that resistance to lateral movement of the first portion of the cover member at the first location is sufficiently great so that the cover member can be moved toward the structure surface into its proper position with the perimeter contact portion of the cover members surrounding the surface opening to cover the surface opening, and with the first portion of the cover member remaining at the first location to stabilize the cover member as it is moved to its covering position, said cover member having a reference deflection less than 1.0 inch and greater than zero.

2. The method as recited in claim 1, wherein said cover member is sufficiently flexible so that when the force is transmitted from the second portion of the cover member to the first portion of the cover member, said cover member is caused to bend with an upwardly concave curvature to cause the first portion of the cover member to be slanted to be more closely in alignment with the surface structure at the first location.

3. The method as recited in claim 2, wherein said cover member is sufficiently flexible to enable a surface contact portion at the first portion of the cover member to come into surface to surface engagement with an adjacent portion of the surface structure so as to resist lateral movement of the first portion of the cover member relative to the surface structure.

4. The method as recited in claim 2, wherein said cover member is sufficiently flexible so that with the contact portion of the cover member in surface to surface engagement with a portion of the surface structure, the cover member is curved in an upward curve away from the structure surface to enable at least a portion of the opening to be visible and permit a person manipulating the cover member to properly view alignment of the cover member.

5. The method as recited in claim 2, wherein said cover member is sufficiently resilient so that when a part of said cover member is released so that a bending moment on the cover is released and a downward force continues to be exerted against a top surface of said cover member, said cover member snaps into its cover position against the structure surface.

6. The method as recited in claim 1, wherein said cover member is applied to said structure surface in a manner that with the cover member positioned so that the first edge portion of the cover member is located at the first location of the structure, the cover member is manually grasped by a person positioning a thumb of the person at an opposite edge location of the cover member approximately diametrically opposed to the first edge portion of the cover member and a finger of the person being positioned against a top surface portion of the cover member between the first edge portion and the opposite edge portion, and the person applies a force toward the structure surface with the finger and a force away from the structure surface with the thumb to transmit the force through the cover member, and said cover member is caused to come into engagement with the structure surface by the thumb being released from the cover member.

7. The method as recited in claim 6, wherein the cover member is sufficiently flexible so that when the finger and thumb of the person each apply said forces to the cover member, said cover member is caused to bend with an outwardly concave surface to cause the first portion of the cover member to be slanted to be more closely in alignment with the surface structure at the first location.

8. The method as recited in claim 7, wherein said cover member is sufficiently flexible to enable a surface contact portion of the first portion of the cover member to come into surface to surface engagement with an adjacent portion of the surface structure so as to resist lateral movement of the first portion of the cover member relative to the surface structure.

9. The method as recited in claim 1, wherein said reference deflection value is no greater than about 0.8 inch.

10. The method as recited in claim 9, wherein said reference deflection value is no greater than about 00.6 inch.

11. The method as recited in claim 1 wherein said structure is made of a wood or woodlike material having a natural wood surface, a veneer surface or some other surface material.

12. A combination comprising
a. a structure;
b. a fastener, positioned in the structure in a manner that there is a surface opening in the structure, said surface opening having a perimeter edge with predetermined maximum edge to edge lateral dimensions;
c. a generally planar cover member comprising
  i. an exposed surface on one side and a contact surface on an opposite side, and a perimeter edge portion having lateral dimensions greater than corresponding lateral dimensions of the surface opening, said perimeter edge portion having a perimeter surface contact portion;
  ii. an adhesive material located at least at a perimeter contact portion of the contact surface;
d) said cover member having been applied to the structure surface to cover the surface opening so that the perimeter portion of the cover member is positioned relative to the perimeter edge portion of the surface opening so that the perimeter contact portion of the cover member is bonded to at least a surface portion of the structure surrounding the surface opening;
e. said cover member being sufficiently resistant to bending so that in the application of the cover member to the structure surface, with the cover member being positioned so that with a first edge portion of the cover member being located at a first location of the structure surface near the perimeter edge of the surface opening, a second portion of the cover member may be grasped in a manner to manipulate the cover member to cause enough force to be transmitted from the second portion through the cover member to the second portion of the cover member to press the first portion of the cover member into engagement with the surface structure at the first location so that resistance to lateral movement of the first portion of the cover member at the first location is sufficiently great so that the cover member can be moved toward the structure surface into its proper position with the perimeter contact portion of the cover members surrounding the surface opening to cover the surface opening, and with the first portion of the cover member remaining at the first location to stabilize the cover member as it is moved to its covering position, said cover member having a reference deflection less than 1.0 inch and greater than zero.

13. A generally planar cover member to cover an exposed fastener in a structure where;
  i. the structure has a structure surface;
  ii. a fastener such as a screw, is positioned in the structure in a manner that there is a surface opening in the structure, said surface opening having a perimeter edge with a predetermined maximum edge to edge lateral dimensions; said cover member comprising
a) an exposed surface on one side, a contact surface on an opposite side, and a perimeter edge portion having lateral dimensions greater than said lateral dimensions;
b) an adhesive material located at least at a perimeter contact portion of the contact surface;
c) said cover member being sufficiently resilient and sufficiently resistant to bending so that in the application of the cover member the cover member may be grasped in a manner to manipulate the cover member to cause enough force to be transmitted so that the cover member can be bent in being moved into its proper covering position and sufficiently resilient to be able to return to its original shape, said cover member having a reference deflection less than 1.0 inch and greater than zero.

14. The cover member as recited in claim 13 wherein said reference deflection value is no greater than about 0.8 inch.

15. The cover member as recited in claim 9, wherein said reference deflection value is no greater than about 0.6 inch.

16. The cover member as recited in claim 13 wherein said cover member is sufficiently flexible so that when the force is transmitted from the second portion of the cover member to the first portion of the cover member, said cover member is caused to bend with an upwardly concave curvature to cause the first portion of the cover member to be slanted to be more closely in alignment with the surface structure at the first location.

* * * * *